(12) United States Patent
Sung (10) Patent No.: US 7,688,877 B2
(45) Date of Patent: Mar. 30, 2010

(54) LASER MACHINING APPARATUS (75) Inventor: Kyu Dong Sung, Seoul (KR)

(73) Assignee: EO Technics Co., Ltd., Kyungki-Do (KR)

( * ) Notice: Subject to any disclaimer, the term of this patent is extended or adjusted under 35 U.S.C. 154(b) by 54 days.

(21) Appl. No.: 12/062,875

(22) Filed: Apr. 4, 2008

(65) Prior Publication Data

US 2008/0279248 A1    Nov. 13, 2008

(30) Foreign Application Priority Data

May 2, 2007    (KR) .................... 10-2007-0042752

(51) Int. Cl.
*H01S 3/08* (2006.01)
(52) U.S. Cl. .................... 372/101; 372/24; 372/50.23
(58) Field of Classification Search .............. 372/101, 372/24
See application file for complete search history.

(56) References Cited

U.S. PATENT DOCUMENTS

2003/0021307 A1* 1/2003 Yamazaki ............. 372/24

FOREIGN PATENT DOCUMENTS

JP    62-280714    * 12/1987

* cited by examiner

*Primary Examiner*—Dung T Nguyen
(74) *Attorney, Agent, or Firm*—Buchanan Ingersoll & Rooney PC (57) ABSTRACT

Provided is a laser machining apparatus. The laser machining apparatus includes: a laser oscillator emitting laser beams; a first dividing means on which the laser beams emitted from the laser oscillator are incident to be selectively divided so that the incident laser beams progress along at least one path from among a pair of first paths; a second dividing means on which the laser beams that passed through any one of the first paths are incident to be selectively divided so that the incident laser beams progress along at least one path from among a pair of second paths; a third dividing means on which the laser beams that passed through the other one of the first paths are incident to be selectively divided so that the incident laser beams progress along at least one path from among a pair of third paths; four pairs of scanners on which the laser beams that passed through the first, second, and third dividing means are incident to each be deflected onto desired positions on a substrate so as to be processed; and a scan lens on which the laser beams that passed through the four pairs of scanners are incident to be collected on a spot having a predetermined diameter and irradiated onto the substrate.

8 Claims, 9 Drawing Sheets

LASER MACHINING APPARATUS

CROSS-REFERENCE TO RELATED PATENT APPLICATION

This application claims the benefit of Korean Patent Application No. 10-2007-0042752, filed on May 2, 2007, in the Korean Intellectual Property Office, the disclosure of which is incorporated herein in its entirety by reference.

BACKGROUND OF THE INVENTION

1. Field of the Invention

The present invention relates to a laser machining apparatus, and more particularly, to a laser machining apparatus capable of dividing a single laser beam into four laser beams and collecting each of the four laser beams thereon using a single scan lens.

2. Description of the Related Art

A laser machining apparatus, in general, transmits a laser beam emitted from a laser oscillator using laser beam transmission means, and performs tasks such as drilling and marking by irradiating the laser beam onto a substrate that is to be finally processed.

Figure 1:
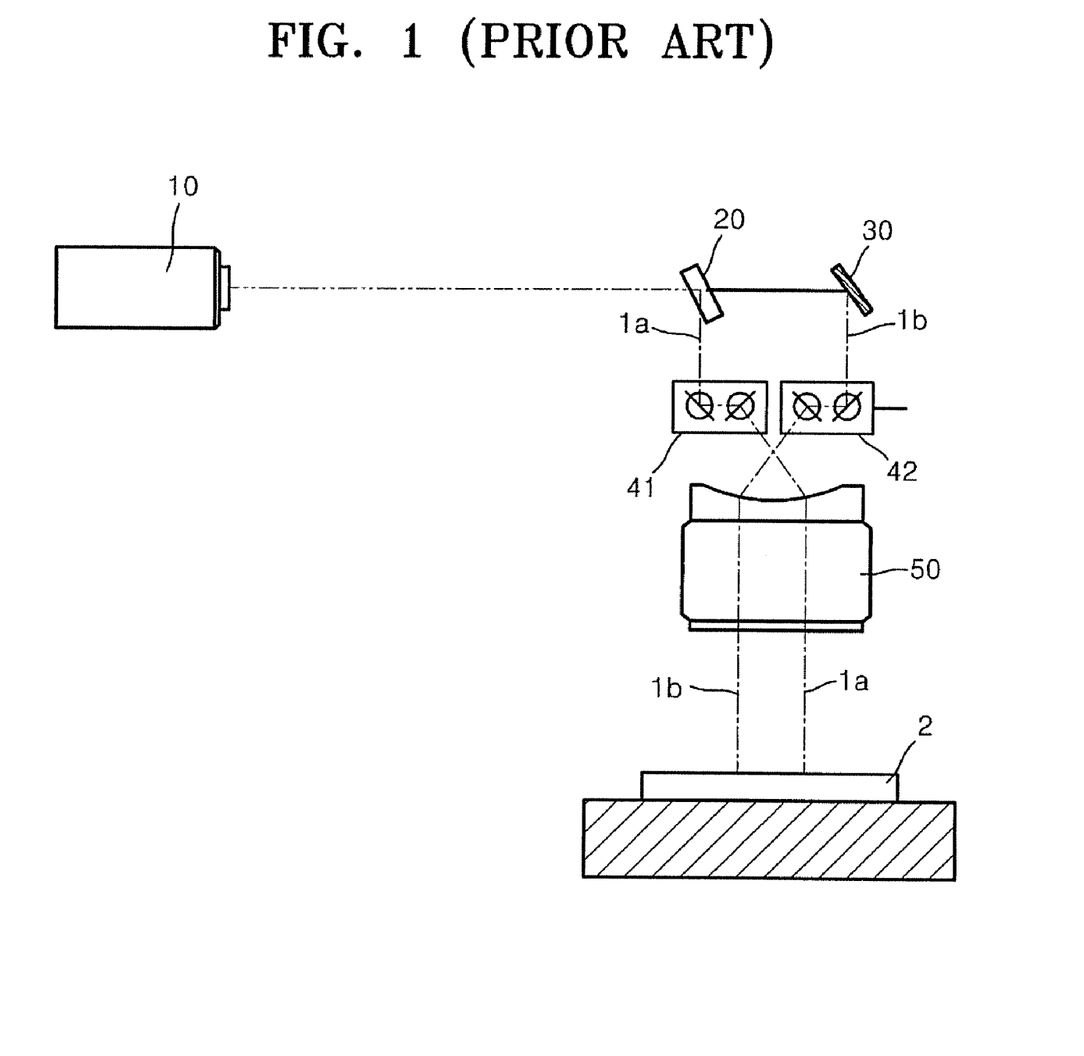
FIG. 1 is a schematic view of a conventional laser machining apparatus.

FIG. 1 is a schematic diagram of a conventional laser machining apparatus.

Referring to FIG. 1, the conventional laser machining apparatus includes a laser oscillator 10, a beam splitter 20, two pairs of scanners 41 and 42, and a scan lens 50.

50% of a laser beam, emitted from the laser oscillator 10, is incident on the beam splitter 20 and penetrates the beam splitter 20, and the remaining 50% of the laser beam is reflected by the beam splitter 20. The laser beam reflected by the beam splitter 20 passes along a first path 1a, is processed through the first pair of the scanners 41 and the scan lens 50, and is irradiated to a substrate 2. The laser beam that penetrated the beam splitter 20 passes along a second path 1b, is processed through a reflection mirror 30, the second pair of the scanners 42, and the scan lens 50, and is irradiated to the substrate 2.

As such, in the conventional laser machining apparatus, the laser beam emitted from the single laser oscillator 10 is divided into two laser beams each having a proportion determined by the beam splitter 20, and the two divided laser beams pass along paths that are different to each other so as to be respectively deflected by the two pairs of the scanners 41 and 42 to desired positions on the substrate 2. Then, each of the two-divided laser beams is collected by the single scan lens 50 and is irradiated to the substrate 2.

While costs of electric and electronic devices adopting semiconductors have currently decreased due to mass-producing thereof, a Unit Per Hour (UPH) realized in a single machining apparatus is an important factor in the current field of manufacturing semiconductor machining apparatuses. However, the conventional laser machining apparatus is limited due to the division of a single laser beam into two laser beams so that there exists a limitation on the UPH to thus improve the conventional laser machining apparatus as a single machining apparatus.

In addition, if laser beams could be divided or could be used all according to a selection by the user, a machining process could be performed by coping well with various circumstances (for example, if any one of the components included the laser beam transmitting beams to transmit any one laser beam of two divided laser beams has problems). However, the conventional laser machining apparatus always divides a single laser beam into two laser beams so that even if any one component from among the various number of components forming the laser beam transmitting means has problems, the whole conventional laser machining apparatus cannot be used.

SUMMARY OF THE INVENTION

The present invention provides a laser machining apparatus having an improved structure capable of dividing a single laser beam into four laser beams, and selecting whether to use laser beam division.

According to an aspect of the present invention, there is provided a laser machining apparatus including: a laser oscillator emitting laser beams; a first dividing means on which the laser beams emitted from the laser oscillator are incident to be selectively divided so as to progress along at least one path from among a pair of first paths; a second dividing means on which the laser beams that passed along one of the first paths are incident to be selectively divided so as to progress along at least one path from among a pair of second paths; a third dividing means on which the laser beams that passed along the other one of the first paths are incident to be selectively divided so as to progress along at least one path from among a pair of third paths; four pairs of scanners on which the laser beams that passed through the first, second, and third dividing means are incident to each be deflected onto desired positions on a substrate so as to be processed; and a scan lens on which the laser beams that passed through the four pairs of scanners are incident to be collected on a spot having a predetermined diameter and irradiated onto the substrate.

At least one of the first, second, and third dividing means may be a shuttle unit including a beam dividing unit, a beam penetrating unit, and a transfer means, the beam dividing unit reflecting a portion of the incident laser beams and allowing the remaining portion of the incident laser beams to penetrate, the beam penetrating unit allowing the whole incident laser beams to penetrate, and the transfer means changing a location of the beam dividing unit or the beam penetrating unit so that the laser beams are incident on any one of the beam dividing unit and the beam penetrating unit.

The beam dividing unit may be a beam splitter which reflects 50% of the incident laser beams and allows the remaining 50% of the incident laser beams to penetrate.

The beam penetrating unit may be a penetration mirror which allows more than 99% of the incident laser beams to penetrate.

The transfer means may include a supporting bracket, a drive source, and a power transmitting unit, the supporting bracket supporting the beam dividing unit and the beam penetrating unit and the power transmitting unit transmitting driving power of the drive source to the supporting bracket so as to move the supporting bracket back-and-forth in either a right or left direction.

At least one of the first, second, and third dividing means may be an Acousto Optic Modulator (AOM) emitting the incident laser beams after modulating the laser beams using an acoustic wave which emits the laser beams by dividing the laser beams into two beams that progress along different paths from each other or emits the laser beams by adjusting the quantity of light of the incident laser beams so that the laser beams progress along a single path.

At least one of the first, second, and third dividing means may be an Electro Optic Modulator (EOM) emitting the incident laser beams after modulating the laser beams using an electric field which adjusts the quantity of light of the incident laser beams and emits the laser beams to progress along a single path.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings, in which exemplary embodiments of the invention are shown.

Figure 2:
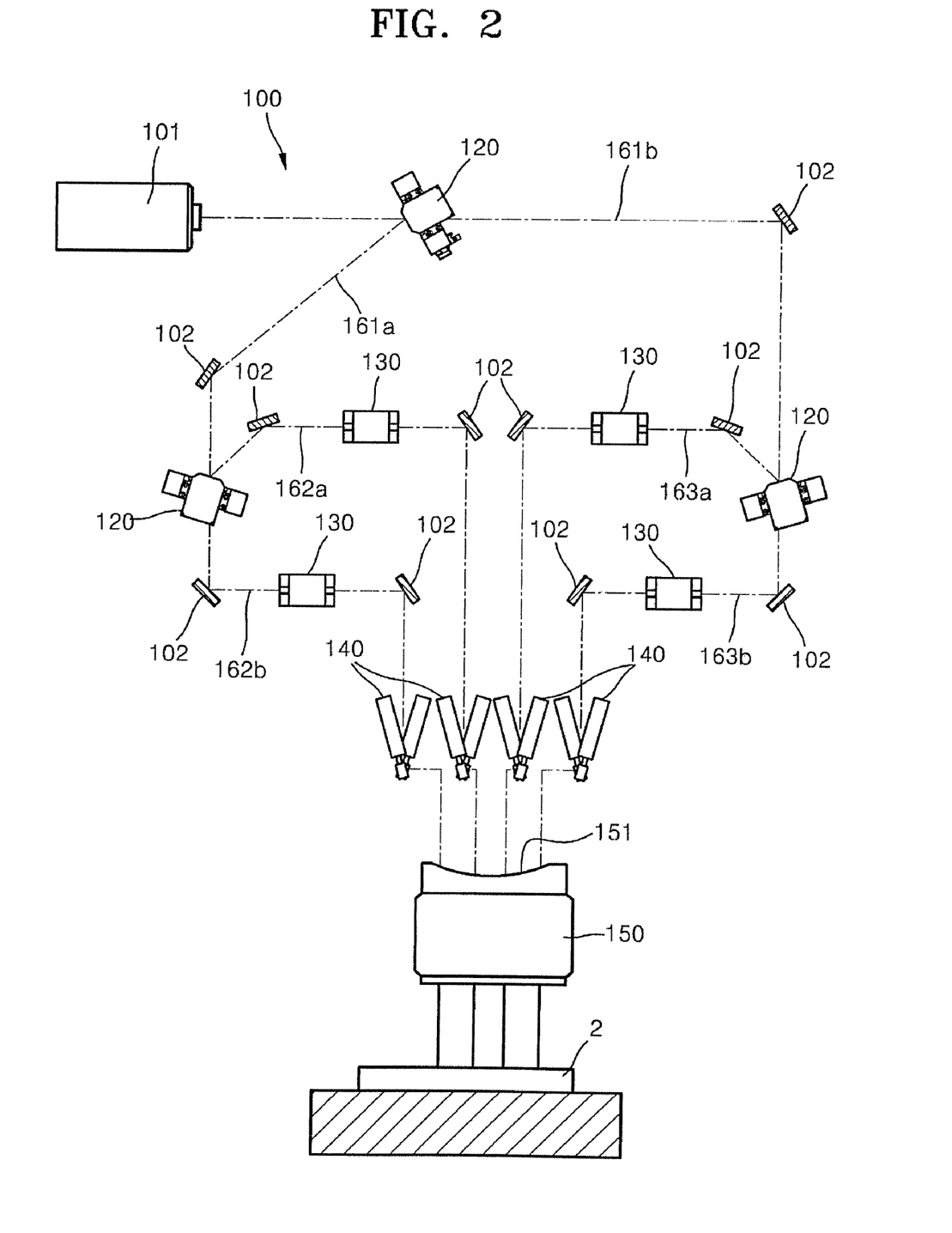
FIG. 2 is a schematic view of a laser machining apparatus according to an embodiment of the present invention.
Figure 3:
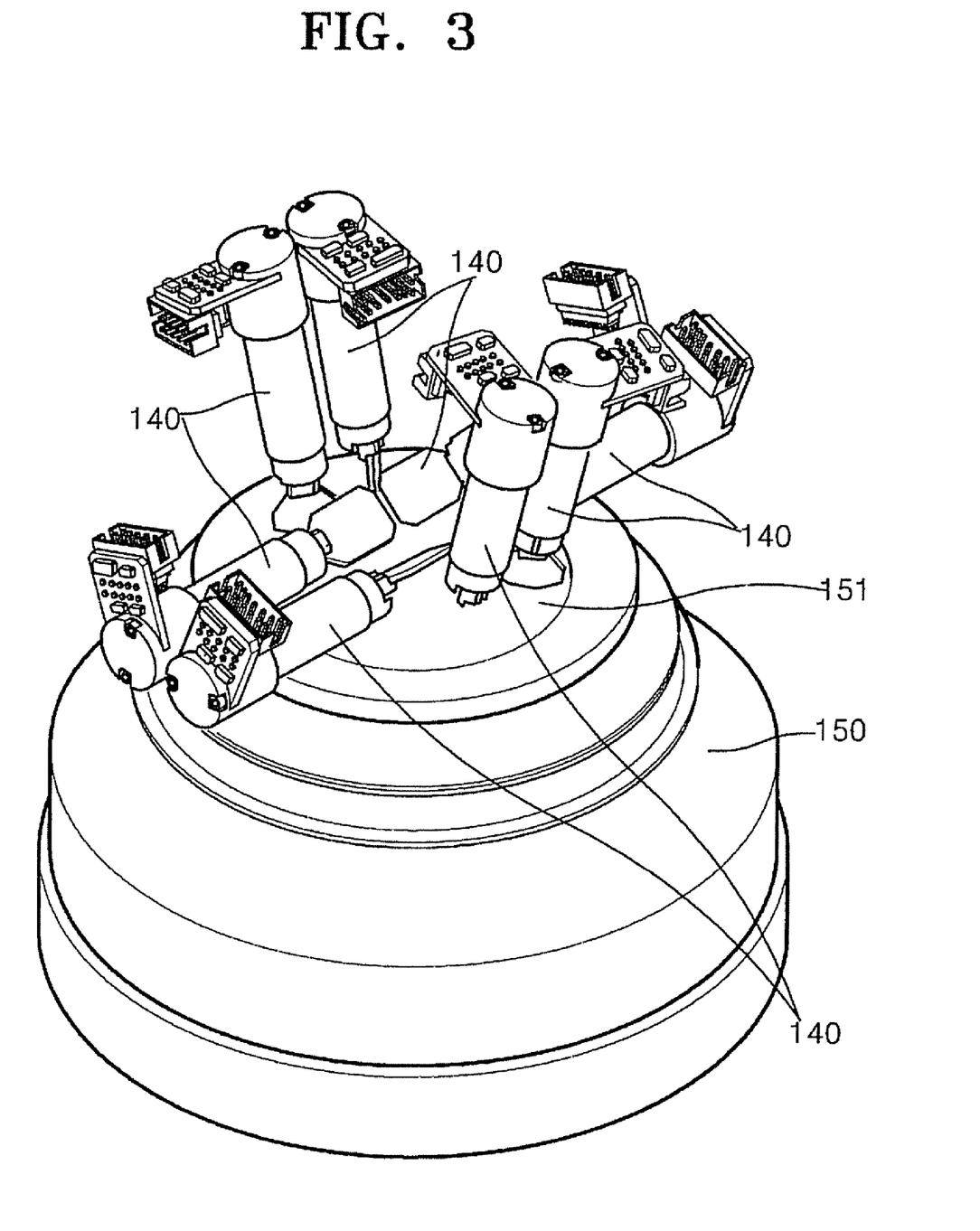
FIG. 3 is a perspective view schematically illustrating four pairs of scanners and a single scan lens included in the laser machining apparatus of FIG. 2.
Figure 4:
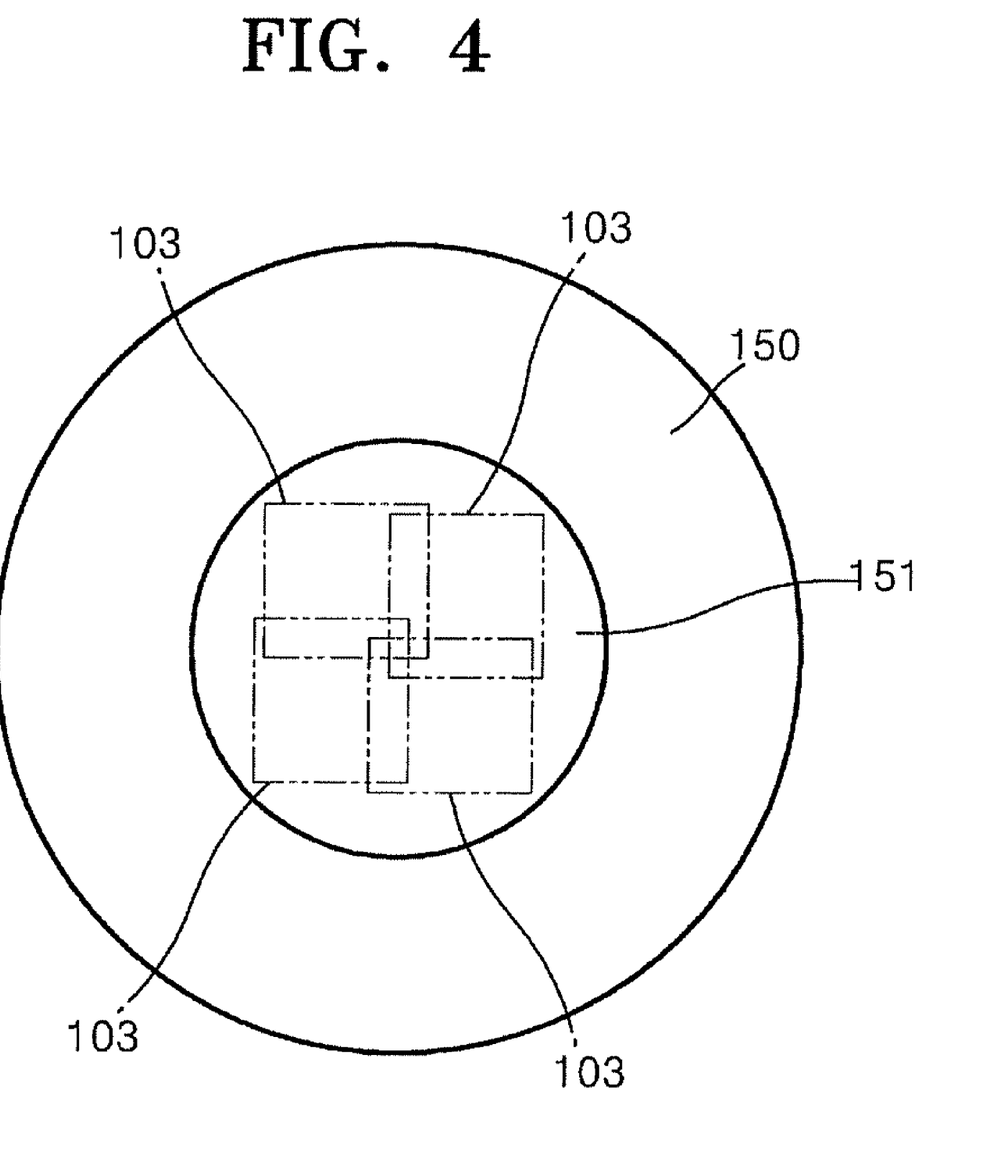
FIG. 4 is a schematic view of an incident region for each laser beam incident on the single scan lens of FIG. 3.
Figure 5:
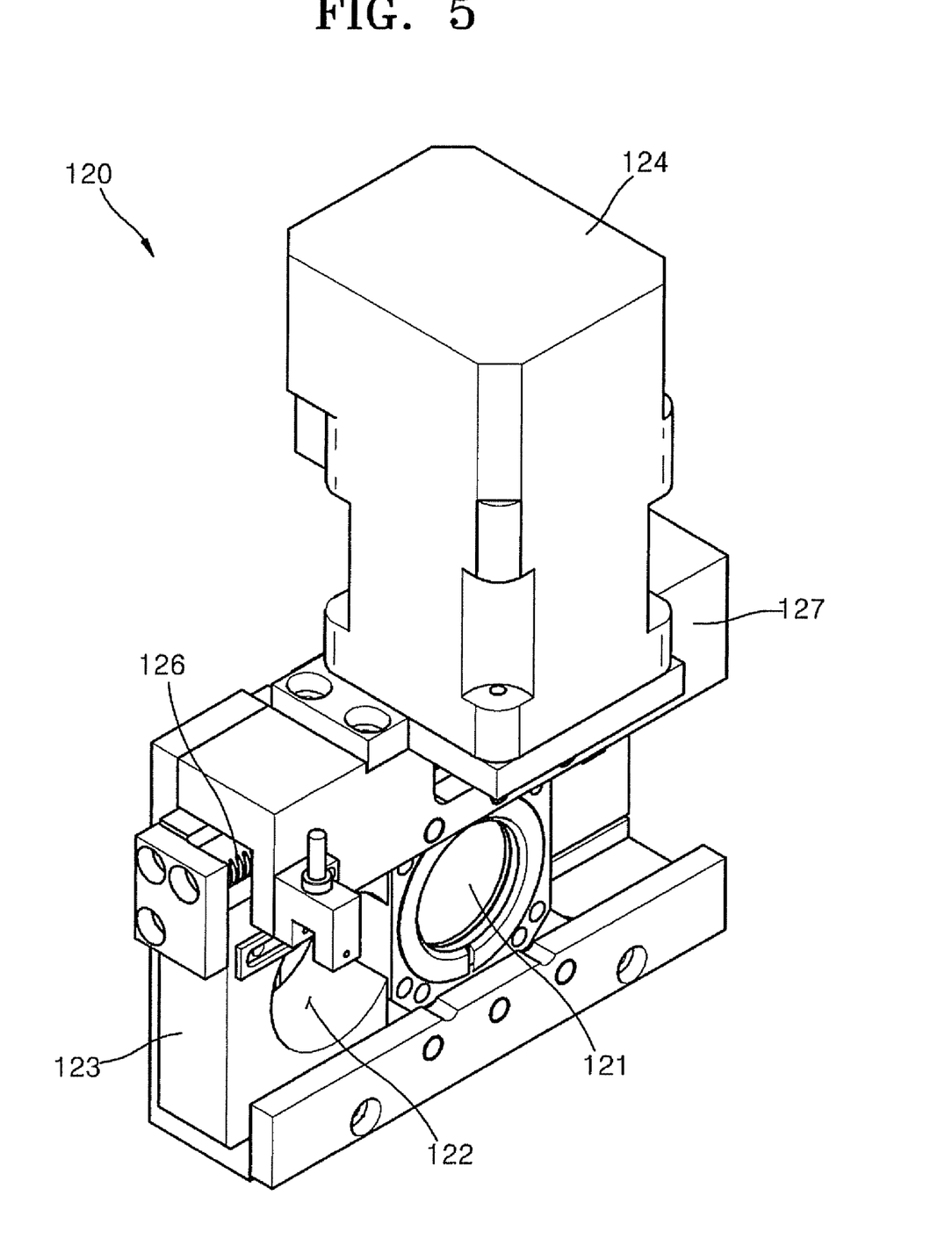
FIG. 5 is a perspective view of a shuttle unit of the laser machining apparatus of FIG. 3.
Figure 6:
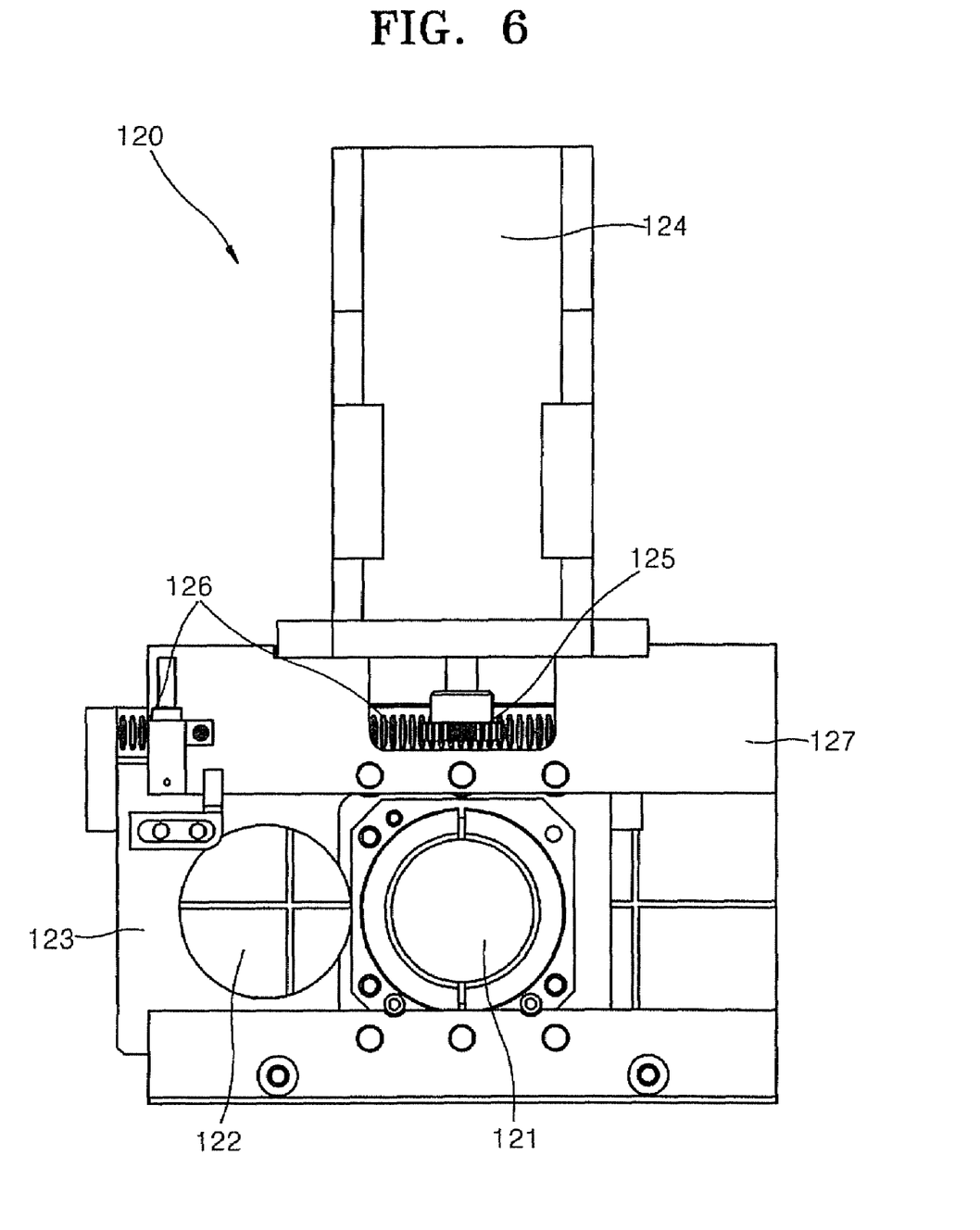
FIG. 6 is a front view of the shuttle unit of FIG. 5.

FIG. 2 is a schematic view of a laser machining apparatus 100 according to an embodiment of the present invention, FIG. 3 is a perspective view schematically illustrating four pairs of scanners 140 and a single scan lens 150 included in the laser machining apparatus 100 of FIG. 2, FIG. 4 is a schematic view of an incident region 103 for each laser beam incident on the single scan lens 150 of FIG. 3, FIG. 5 is a perspective view of one of the shuttle units 120 of the laser machining apparatus 100 of FIG. 3, and FIG. 6 is a front view of the shuttle unit 120 of FIG. 5.

Referring to FIGS. 2-6, the laser machining apparatus 100 is configured to collect four laser beams divided from a single laser beam by using the single scan lens 150. The laser machining apparatus 100 includes a laser oscillator 101, the shuttle units 120 respectively as first, second, and third dividing means, the four pairs of scanners 140, and the single scan lens 150.

The laser oscillator 101 generates laser beams that are energy sources of a laser machining process. According to a type of a substrate 2 to be processed or a processing method, the laser oscillator 101 that is capable of generating laser beams having a wavelength, from among various wavelengths, that is most suitable for a desired processing, for example, wavelengths such as ultraviolet rays, visible rays, and infrared rays is selected.

The first, second, and third dividing means selectively divide incident laser beams to progress along at least one path from among a pair of paths. A laser beam emitted from the laser oscillator 101 is incident on the first dividing means to be reflected thereon and/or penetrate therethrough. The laser beam reflected by the first dividing means is incident on the second dividing means to be reflected thereon or penetrate therethrough. The laser beam that penetrated the first dividing means is incident on the third dividing means to be reflected thereon or penetrate therethrough.

In the current embodiment, the shuttle units 120 are used as each of the first, second, and third dividing means and each includes a beam dividing unit 121, a beam penetrating unit 122, and a transfer means.

The beam dividing unit 121 divides the incident laser beam into two laser beams. Then, the beam dividing unit 121 reflects one laser beam to the side on which the laser beam is incident and the other laser beam penetrates to the opposite side from which the laser beam is incident. In the current embodiment, a beam splitter splitting the incident laser beam into two laser beams each having 50% of the total energy of the incident laser beam is used as the beam dividing unit 121. In the beam splitter, a reflection film having a reflection rate of approximately 50% is coated on one surface on which the laser beam is incident and an antireflection film having a penetration rate of approximately 99.9% is coated on the other surface through which the split laser beam penetrates.

The beam penetrating unit 122 allows the incident laser beam to penetrate to the opposite side on which the laser beam is incident. In the current embodiment, a member, in which a penetration hole is formed at the center, is used as the beam penetrating unit 122. Meanwhile, a penetration mirror through which more than 99% of the incident laser beam penetrates may be used as the beam penetrating unit 122, and an antireflection film having a penetration rate of approximately 99.9% is coated on both sides of the penetration mirror.

The transfer means changes the location of the beam dividing unit 121 or the beam penetrating unit 122 so that the laser beam incident on the side of the shuttle units 120 is incident on at least one of the beam dividing unit 121 and the beam penetrating unit 122, and includes a supporting bracket 123, a base 127, a drive source, and a power transmitting unit.

The supporting bracket 123 supports the beam dividing unit 121 and the beam penetrating unit 122. The drive source provides power to move the supporting bracket 123 back-and-forth in a right or left direction, and a motor 124 is mainly used as the drive source. The supporting bracket 123 is combined to move in a right or left direction with respect to the base 127 onto which the motor 124 is fixed. The power transmitting unit may include a pinion member 125 and a rack member 126. The pinion member 125 is combined to the axis of rotation of the motor 124 as on the same axle and engages with the rack member 126 fixed to the supporting bracket 123. When the motor 124 and the pinion member 125 rotate forwardly or reversely, the rack member 126 engaged with the pinion member 125 moves straight in a right or left direction and the supporting bracket 123 to which the rack member 126 is fixed moves along with the rack member 126, and thus, the locations of the beam dividing unit 121 and the beam penetrating unit 122 can be changed.

Since the location of the beam dividing unit 121 or the beam penetrating unit 122 can be changed, a progress path of the laser beam may be controlled. That is, when the beam dividing unit 121 is located on the progress path of the laser beam, a part of the incident laser beam is reflected from the incident surface of the beam dividing unit 121 to the side on which the laser beam is incident and the remaining laser beam penetrates to the opposite side on which the laser beam is incident. Meanwhile, when the beam penetrating unit 122 is located on the progress path of the laser beam, the entire incident laser beam penetrates to the opposite side on which the laser beam is incident.

The laser beam that passed through the shuttle units 120 and reflected from reflection mirrors 102 is incident on beam expanders 130. If a diameter of the laser beam is adjusted using the beam expanders 130, a focusing distance to which the laser beam is collected and the size of the collected spot may be changed by the scan lens 150 and thus various processing methods and types of the substrate 2 may be used. The beam expanders 130 are disposed at upstream sides of the four pairs of scanners 140. There are four beam expanders 130, which respectively correspond to the four laser beams.

The four pairs of scanners 140 deflect the incident laser beam to desired positions on the substrate 2 and generally include X-axis Galbanometer scanners to control the incident laser beam to an X-axis direction, and Y-axis Galbanometer scanners to control the incident laser beam to a Y-axis direction. Each pair of the scanners 140 denotes a pair including the X-axis Galbanometer scanner and the Y-axis Galbanometer scanner. In the current embodiment, there are four pairs of scanners 140 which respectively correspond to the four laser beams.

The single scan lens 150 collects the laser beam that is incident on the four pairs of scanners 140 to a spot having a predetermined diameter and irradiates the collected laser beam onto the substrate 2 that is to be processed. In the current embodiment, four laser beams are incident on an incident surface 151 of the single scan lens 150. As shown in FIG. 4, each of the laser beams passing through the four pairs of scanners 140 is incident on the side of the single scan lens 150 so as to respectively form one of the incident regions 103 on the incident surface 151 of the scan lens 150. In general, an f-theta lens may be mainly used as the scan lens 150.

Hereinafter, the progress path of the laser beam in the laser machining apparatus 100 according to the current embodiment is described with reference to FIGS. 2-6. Firstly, the case where the shuttle unit 120 is adjusted for the beam dividing unit 121 to be located on the progress path of the laser beam is illustrated.

The laser beam emitted from the laser oscillator 101 is incident at the side of the beam dividing unit 121 of the shuttle unit 120 and the single laser beam is divided by the beam dividing unit 121 into two laser beams. The laser beam reflected by the beam dividing unit 121 progresses along a first path 161a at the side on which the laser beam is incident and the laser beam that penetrated the beam dividing unit 121 progresses along first path 161b to the opposite side on which the laser beam is incident.

The laser beam that progressed along the first path 161a at the side on which the laser beam is incident is incident again on the side of the beam dividing unit 121 of the shuttle unit 120, the laser beam reflected by the beam dividing unit 121 progresses along a second path 162a at the side on which the laser beam is incident, and the laser beam that penetrated the beam dividing unit 121 progresses along a second path 162b to the opposite side on which the laser beam is incident.

The laser beam that progressed along the first path 161b to the opposite side on which the laser beam is incident is also incident on the side of the beam dividing unit 121 of the shuttle unit 120, the laser beam reflected by the beam dividing unit 121 progresses along a third path 163a at the side on which the laser beam is incident, and the laser beam that penetrated the beam dividing unit 121 progresses along a third path 163b to the opposite side on which the laser beam is incident.

As such, the paths of the four laser beams are adjusted by the reflection mirrors 102 so as to be incident on the four pairs of scanners 140 and the four laser beams passing through the four pairs of scanners 140 are incident on the single scan lens 150 so as to be irradiated onto the substrate 2.

Meanwhile, according to combinations of various cases, for example, the case where any one shuttle unit 120 of the three shuttle units 120 locates the beam dividing unit 121 on the progress path of the laser beam and the other shuttle units 120 of the three shuttle units 120 locates the beam penetrating unit 122 on the progress path of the laser beam, the single laser beam may be divided by four or three or two to perform a machining process or the single laser beam is used as it as to perform a machining process.

The laser machining apparatus according to the embodiment of the present invention is configured to irradiate the four laser beams, divided from the single laser beam, onto the substrate so as to be processed and thus the time consumed for a process per a substrate may be reduced and the UPH realized in a single machining apparatus may be maximized. In addition, four pairs of scanners and the single scan lens are combined to correspond to each other to configure one laser machining apparatus so that its manufacture cost may be reduced as compared with that of the conventional laser machining apparatus configured such that one pair of the scanners and one scan lens correspond to each other.

Moreover, since the laser machining apparatus according to the embodiment of the present invention can adjust the progress paths of the laser beams using the shuttle units including the beam dividing unit and the beam penetrating unit, even if any components from among the components forming the entire laser machining apparatus have problems, the laser machining apparatus can still be operated. Thus, the stability of production can be improved and additional costs for purchasing so as to replace the broken components may be reduced.

Figure 7:
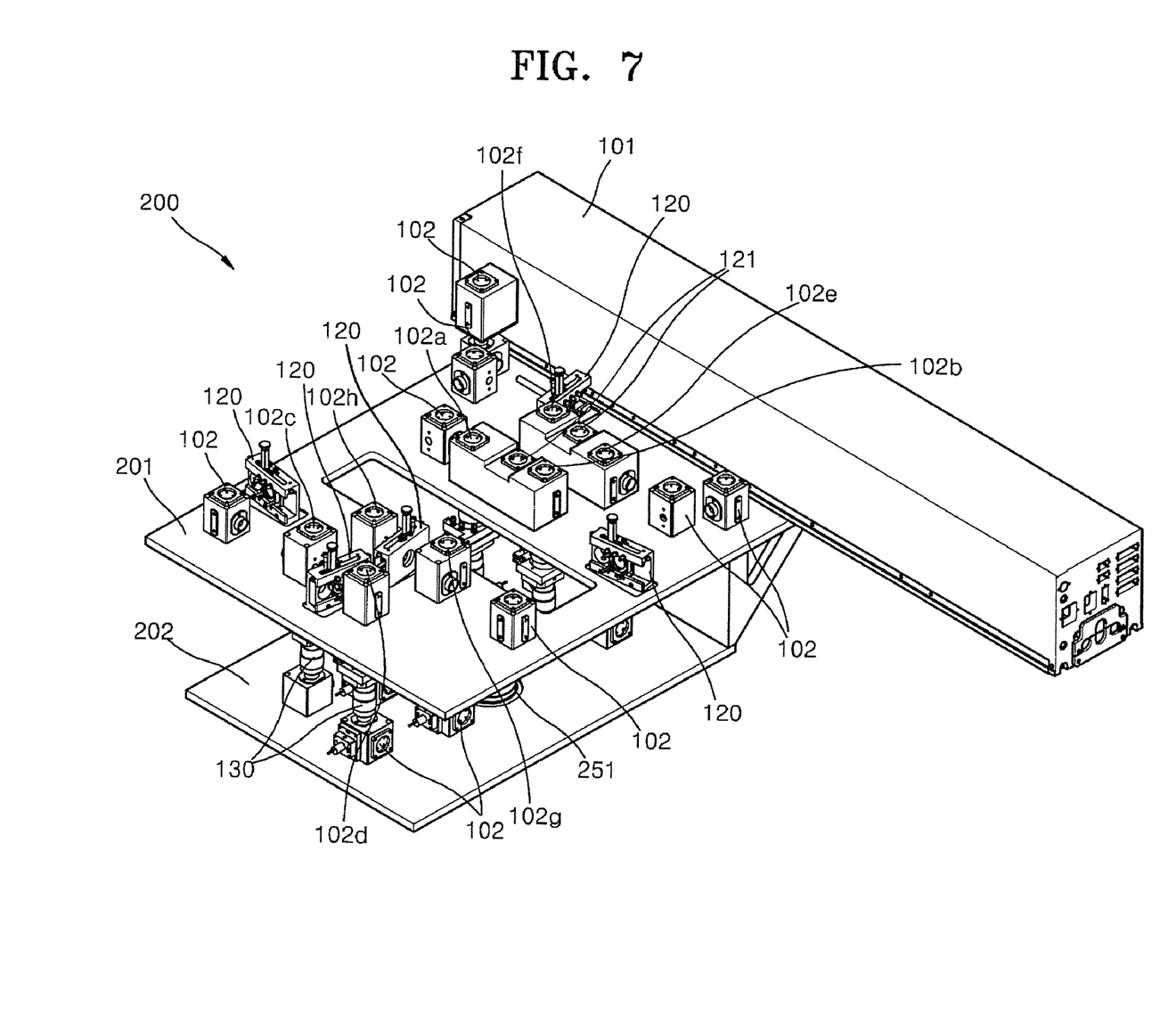
FIG. 7 is a perspective view schematically illustrating a laser machining apparatus according to another embodiment of the present invention.
Figure 8:
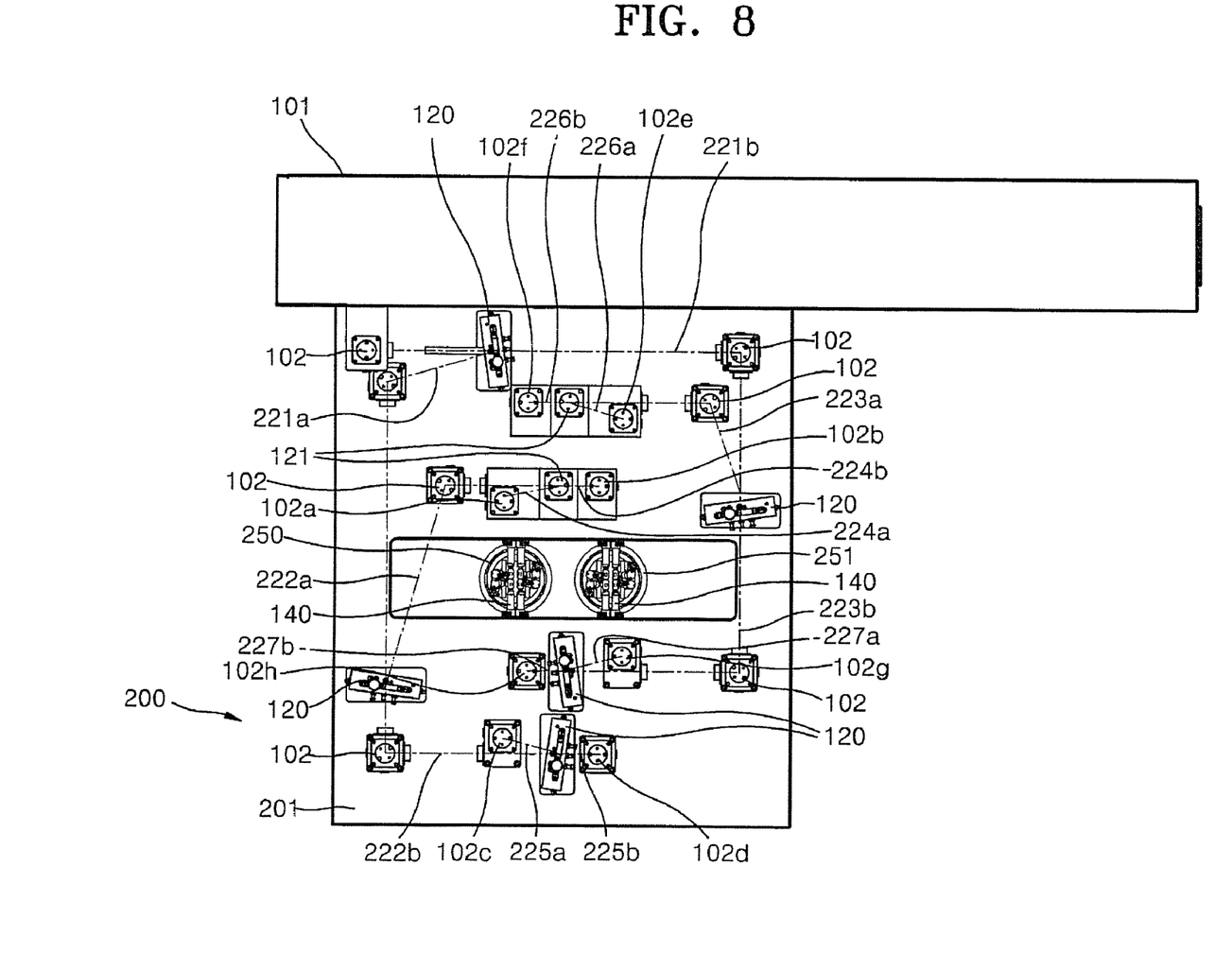
FIG. 8 is a plane view of an upper base of the laser machining apparatus of FIG. 7.
Figure 9:
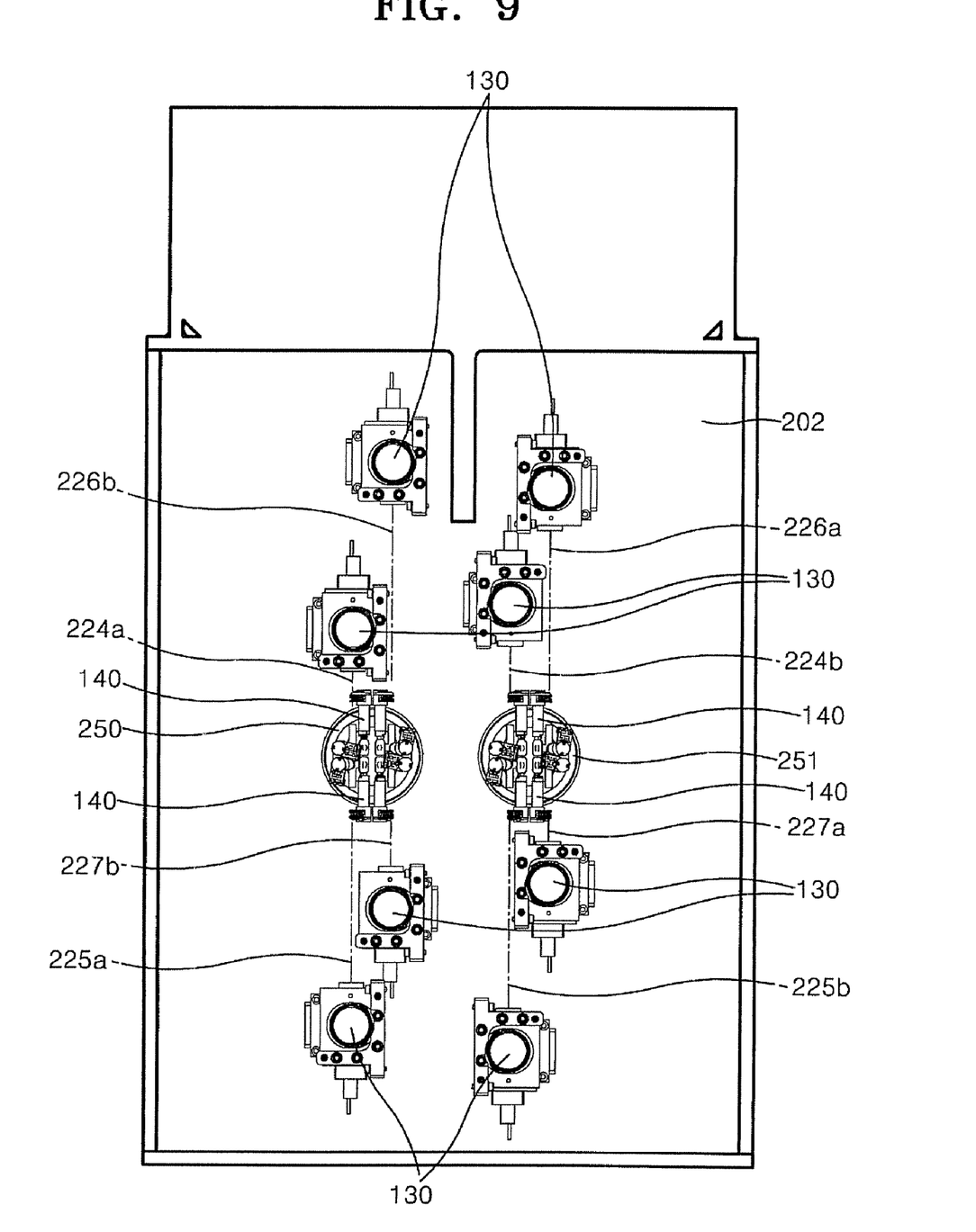
FIG. 9 is a plane view of a lower base of the laser machining apparatus of FIG. 7.

Meanwhile, FIG. 7 is a perspective view schematically illustrating a laser machining apparatus 200 according to another embodiment of the present invention, FIG. 8 is a plane view of an upper base 201 of the laser machining apparatus 200 of FIG. 7, and FIG. 9 is a plane view of a lower base 202 of the laser machining apparatus 200 of FIG. 7.

Referring to FIGS. 7-9, the laser machining apparatus 200 according to the current embodiment selectively divides a single laser beam into eight laser beams at most so as to perform a laser machining process for the substrate 2 that is to be processed and includes the upper base 201 and the lower base 202 on which optical components are distributed. In FIGS. 7-9, like reference numerals illustrated in FIGS. 2-6 denote like elements so that the detailed description thereof is omitted.

In the laser machining apparatus 200, the laser beam emitted from the laser oscillator 101 is incident to the first dividing means, that is, the beam dividing unit 121 of the shuttle unit 120 and the single laser beam is divided by the beam dividing unit 121 into two laser beams. The laser beam reflected by the beam dividing unit 121 progresses along a first path 221a at the side on which the laser beam is incident and the laser beam that penetrated the beam dividing unit 121 progresses along a first path 221b to the opposite side on which the laser beam is incident.

The laser beam that progressed along the first path 221a at the side on which the laser beam is incident is again incident on the second dividing means, that is, the beam dividing unit 121 of the shuttle unit 120, and thus, the laser beam reflected by the beam dividing unit 121 progresses along a second path 222a at the side on which the laser beam is incident, and the laser beam that penetrated the beam dividing unit 121 progresses along the second path 222b to the opposite side on which the laser beam is incident.

The laser beam that progressed along the first path 221b to the opposite side on which the laser beam is incident is also incident on the third dividing means, that is, the beam dividing unit 121 of the shuttle unit 120, and thus, the laser beam reflected by the beam dividing unit 121 progresses along a third path 223a at the side on which the laser beam is incident, and the laser beam that penetrated the beam dividing unit 121 progresses along a third path 223b to the opposite side on which the laser beam is incident.

The progress path of the laser beam passing along the pair of second paths 222a and 222b and the pair of third paths 223a and 223b is again divided by the shuttle unit 120 of each fourth, fifth, sixth, and seventh dividing means to respectively pass along a pair of fourth paths 224a and 224b, a pair of fifth paths 225a and 225b, a pair of sixth paths 226a and 226b, and a pair of seventh paths 227a and 227b. Thus, the laser beam is finally divided into eight beams. The progress paths of the laser beams are respectively adjusted by the reflection mirrors 102a, 102b, 102c, 102d, 102e, 102f, 102g, and 102h to be directed to the side of the lower base 202.

The eight laser beams are incident on eight pairs of scanners 140 once through eight beam expanders 130 installed to the lower base 202, respectively. Four laser beams from among eight laser beams are incident on a first scan lens 250, one of a pair of the scan lenses, and remaining four laser beams are incident on a second scan lens 251, another one of a pair of the scan lenses, so that incident laser beams are irradiated onto the substrate 2 to be processed.

The laser machining apparatus according to another embodiment of the present invention can perform a laser machining process using a laser beam divided into eight laser beams at most so that the UPH realized in a single machining apparatus may be maximized.

In the embodiments of the present invention, the mechanical shutter type shuttle units 120 each including the beam dividing unit 121 formed of a beam splitter and the beam penetrating unit 122 formed of a penetration hole are used as the dividing means. However, in emitting the incident laser beams after modulating the laser beams using an acoustic wave, an Acousto Optic Modulator (AOM) which emits the laser beams by dividing the laser beams into two laser beams that progress along different paths from each other or emit the laser beams by adjusting the quantity of light of the incident laser beams so as to progress the incident beams along a single path may be used as a dividing means.

The laser beams divided by the AOM may be adjusted to respectively have the same energy amount or an energy amount having a predetermined ratio (for example, one that is 30% of the quantity of light of the incident laser beams and another one that is 70% of the quantity of light of the incident laser beams) as appropriate for working conditions. The AOM is well-known in the field of the art to which the present invention pertains and thus a more detailed description thereof is omitted.

In addition, in the embodiments of the present invention, in emitting the incident laser beams after modulating the laser beams using an electric field, an Electro Optic Modulator (EOM) which adjusts the quantity of light of the incident laser beams and emits the laser beams so as to progress along a single path may be used as a dividing means. The EOM can be adjusted to emit the laser beams having a quantity of light reduced by a fixed ratio (for example, 70% of the quantity of light of the incident laser beams), compared with that of the quantity of light of the incident laser beam. The EOM is well-known in the field of the art to which the present invention pertains and thus a more detailed description thereof is omitted.

In addition, in the embodiments of the present invention described with reference to FIGS. 2 and 7, the dividing means is formed only with the shuttle units, respectively; however, the number of shuttle units, the AOM, and the EOM can be appropriately combined so that various types of dividing means can be installed to one laser machining apparatus.

In the embodiments of the present invention, the laser beams that respectively passed through the four pairs of scanners 140 are incident on four incident regions 103, respectively, that are virtually divided on the incident surface 151 of the single scan lens 150, as illustrated in FIG. 4. However, the four incident regions 103 respectively corresponding to the four pairs of scanners 140 can be extended to cover the whole surface of the incident surface 151 of the single scan lens 150 so that even if three of the four pairs of scanners 140 have problems and thus are not able to operate, one pair of the four pairs of scanners 140 can cover the whole surface of the incident surface 151 of the single scan lens 150.

The exemplary embodiments have been illustrated; however, the laser machining apparatus according to the present invention is not limited thereto. According to modifications or combinations of the embodiments, various types of laser machining apparatus can be realized having the scope of the present invention and thus without departing from the technical spirit of the present invention.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A laser machining apparatus comprising:
   a laser oscillator emitting laser beams;
   a first dividing means on which the laser beams emitted from the laser oscillator are incident to be selectively divided so as to progress along at least one path from among a pair of first paths;
   a second dividing means on which the laser beams that passed along one of the first paths are incident to be selectively divided so as to progress along at least one path from among a pair of second paths;
   a third dividing means on which the laser beams that passed along the other one of the first paths are incident to be selectively divided so as to progress along at least one path from among a pair of third paths;
   four pairs of scanners on which the laser beams that passed through the first, second, and third dividing means are incident to each be deflected onto desired positions on a substrate so as to be processed; and
   a scan lens on which the laser beams that passed through the four pairs of scanners are incident to be collected on a spot having a predetermined diameter and irradiated onto the substrate.

2. The laser machining apparatus of claim 1, wherein at least one of the first, second, and third dividing means is a shuttle unit including a beam dividing unit, a beam penetrating unit, and a transfer means, the beam dividing unit reflecting a portion of the incident laser beams and allowing the remaining portion of the incident laser beams to penetrate, the beam penetrating unit allowing the whole incident laser beams to penetrate, and the transfer means changing a location of the beam dividing unit or the beam penetrating unit so that the laser beams are incident on any one of the beam dividing unit and the beam penetrating unit.

3. The laser machining apparatus of claim 2, wherein the beam dividing unit is a beam splitter which reflects 50% of the incident laser beams and allows the remaining 50% of the incident laser beams to penetrate.

4. The laser machining apparatus of claim 2, wherein the beam penetrating unit is a penetration mirror which allows more than 99% of the incident laser beams to penetrate.

5. The laser machining apparatus of claim 2, wherein the transfer means comprises a supporting bracket, a drive source, and a power transmitting unit, the supporting bracket supporting the beam dividing unit and the beam penetrating unit and the power transmitting unit transmitting driving power of the drive source to the supporting bracket so as to move the supporting bracket back-and-forth in either a right or left direction.

6. The laser machining apparatus of claim 1, wherein at least one of the first, second, and third dividing means is an Acousto Optic Modulator (AOM) emitting the incident laser beams after modulating the laser beams using an acoustic wave which emits the laser beams by dividing the laser beams into two beams that progress along different paths from each other or emits the laser beams by adjusting the quantity of light of the incident laser beams so that the laser beams progress along a single path.

7. The laser machining apparatus of claim 1, wherein at least one of the first, second, and third dividing means is an Electro Optic Modulator (EOM) emitting the incident laser beams after modulating the laser beams using an electric field which adjusts the quantity of light of the incident laser beams and emits the laser beams to progress along a single path.

8. A laser machining apparatus comprising:
- a laser oscillator emitting laser beams;
- a first dividing means on which the laser beams emitted from the laser oscillator are incident to be selectively divided so as to progress along at least one path from among a pair of first paths;
- a second dividing means on which the laser beams that passed along any one of the first paths are incident to be selectively divided so that the incident laser beams progress along at least one path from among a pair of second paths;
- a third dividing means on which the laser beams that passed along the other one of the first paths are incident to be selectively divided so that the incident laser beams progress along at least one path from among a pair of third paths;
- a fourth dividing means on which the laser beams that passed along any one of the second paths are incident to be selectively divided so that the incident laser beams progress along at least one path from among a pair of fourth paths;
- a fifth dividing means on which the laser beams that passed along the other one of the second paths are incident to be selectively divided so that the incident laser beams progress along at least one path from among a pair of fifth paths;
- a sixth dividing means on which the laser beams that passed along any one of the third paths are incident to be selectively divided so that the incident laser beams progress along at least one path from among a pair of sixth paths;
- a seventh dividing means on which the laser beams that passed along the other one of the third paths are incident to be selectively divided so that the incident laser beams progress along at least one path from among a pair of seventh paths;
- eight pairs of scanners on which the laser beams that passed through the first through seventh dividing means are incident to each be deflected onto desired positions on a substrate so as to be processed; and
- a first scan lens corresponding to four pairs of scanners from among the eight pairs of scanners; and
- a second scan lens corresponding to the remaining four pairs of scanners from among the eight pairs of scanners.

* * * * *